United States Patent
Mannerfelt

(10) Patent No.: US 7,777,495 B2
(45) Date of Patent: Aug. 17, 2010

(54) METHOD AND A DEVICE FOR DETECTING SIGNAL LAMPS IN A VEHICLE

(75) Inventor: Carl Mannerfelt, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 408 days.

(21) Appl. No.: 12/065,294

(22) PCT Filed: Sep. 16, 2005

(86) PCT No.: PCT/SE2005/001355

§ 371 (c)(1),
(2), (4) Date: Feb. 29, 2008

(87) PCT Pub. No.: WO2007/032716

PCT Pub. Date: Mar. 22, 2007

(65) Prior Publication Data

US 2008/0224708 A1 Sep. 18, 2008

(51) Int. Cl.
*G01R 31/00* (2006.01)
(52) U.S. Cl. .................. 324/414; 324/504; 324/511; 324/556; 340/458; 340/642
(58) Field of Classification Search .............. 324/414, 324/503, 504, 511, 555, 556; 340/431, 458, 340/641, 642
See application file for complete search history.

(56) References Cited

U.S. PATENT DOCUMENTS

| | | | | |
|---|---|---|---|---|
| 3,852,733 A | * | 12/1974 | Sakurai | 324/503 |
| 5,095,274 A | * | 3/1992 | Brokaw | 324/414 |
| 5,313,165 A | * | 5/1994 | Brokaw | 324/414 |
| 6,243,009 B1 | | 6/2001 | Fritz et al. | |
| 6,466,028 B1 | * | 10/2002 | Coppinger et al. | 324/504 |
| 6,535,113 B1 | | 3/2003 | Gravolin | |
| 6,570,505 B1 | * | 5/2003 | Malenfant | 340/641 |
| 7,403,100 B2 | * | 7/2008 | Peterson | 324/504 |
| 2004/0095234 A1 | | 5/2004 | Sugimoto et al. | |
| 2005/0017856 A1 | * | 1/2005 | Peterson | 340/431 |

FOREIGN PATENT DOCUMENTS

| | | |
|---|---|---|
| DE | 19950851 A1 | 5/2000 |
| DE | 10107578 A1 | 8/2002 |

OTHER PUBLICATIONS

International Search Report for corresponding International Application PCT/SE2005/001355, 2006.

* cited by examiner

*Primary Examiner*—Timothy J Dole
(74) *Attorney, Agent, or Firm*—WRB-IP LLP

(57) ABSTRACT

Provided are a device and a method of detecting signal lamps in a vehicle, in particular in a large vehicle, being provided with a plurality of signal lamps each being capable of switching between an OFF-phase and an ON-phase. The method includes the steps of during the OFF-phase of a vehicle signal lamp to be probed inducing a probing current by connecting an electric current generator to said vehicle signal lamp circuit, where the probing current is lower than the nominal current for the lamp in question. The next step is to detect the electric voltage level over the lamp circuit and determining vehicle signal lamp characteristics such as type and condition based on said electric voltage level detection. The result of the determination is that the signal lamp is a LED lamp being connected, when the detected voltage level is within a predetermined interval between a first voltage level and a second voltage level.

19 Claims, 1 Drawing Sheet

METHOD AND A DEVICE FOR DETECTING SIGNAL LAMPS IN A VEHICLE

BACKGROUND AND SUMMARY

The present invention relates to a method and a device for detecting signal lamps in a vehicle, in particular in a large vehicle, independently of which signal lamp type being used, filament or LED lamps, and to determine condition of said lamps, e.g. being faulty or not connected, or being connected.

Vehicle signal lamps, such as turn, brake, head and tail lights, and length or width indicator lamps, in particular those provided on a trailer to be towed by a car or a truck, require special safety measures. Accordingly, certain large vehicle regulations dictate, that it must be possible from a truck instrumentation to monitor, whether the trailer lights, especially the turn signal lamps are in working order or not. Conventionally, a trailer presence monitoring system is provided which is able to perform this task. Such a system may be a part of the electronic or electromechanical signal lamp control unit.

For the purpose of the present application the term "trailer" comprises both trailers and semi-trailers being hauled or towed by a vehicle such as a truck or tractor.

Monitoring of absence or presence of a trailer is conventionally carried out by direct or indirect measurement of the current, which is consumed by the light system of the trailer. This current flowing through the signal lamps is detected during the ON-period of the signal lamps. Since trailers generally have been provided with lamps of the conventional filament type, the current consumed by the light system of the trailer has been quite high, thus making it easy to monitor and detect the presence or absence of a trailer by measuring the current through the power line feeding the lamps on the trailer, and comparing the level of said current to a known threshold, e.g. less than 50% of nominal lamp current. With a current below this threshold, the monitoring system will indicate that the trailer lamp is faulty or not present at all. Depending on the system, the absence of one or more lamps will also indicate the absence of a trailer. In addition, because of the high currents, the measurement has been possible to perform by means of components, which have a rather poor resolution, making the components and also the measurement inexpensive.

The above mentioned current measurement principles can be performed directly or indirectly, e.g. by an electronic circuit measuring the voltage over a shunt resistor carrying the current, or by Hall effect circuits measuring the induced magnetic field around a conductor carrying the current, respectively. Alternatively, "smart power" semiconductor devices for switching on and off the current to the signal lamps can provide an electronic signal indicating the current level flowing through the device. Such "smart power" semiconductor devices comprise a low resolution A/D-converter for measuring the output current. These measurement principles work for the case where conventional filament lamps are used, and only during the ON-phase.

However, at present, it has been commercially practical for manufacturers of vehicles and trailers to use lamps equipped with Light Emitting Diodes or LED's, where the LED lights are designed as lattice networks of LED's and preloading resistors for controlling the nominal current through the LED's. Lamps based on LED technology have been utilised in particular for yellow trailer extension indicators (width and height), and turn signal lamps, but also lately as other lights as well, such as brake lights, etc.

One property of such diodes is that they consume a minimal amount of power compared to conventional lights. Diodes are advantageous in many ways, such as better service life expectancy leading to improved reliability and life cycle costs. However, it makes the monitoring and detection as explained above difficult or impossible, since the power consumption by a trailer equipped with LED-lights involves currents which will not be above the lowest resolution step of the used detector component. This may lead to the detection of an absence of a trailer, although a trailer is in fact attached properly to the vehicle. Such erroneous detection of the "absence" of a trailer will lead to a number of inconveniencies and problems for the electrical system of the vehicle, since many system parameters differs depending on the presence or absence of a trailer.

In order to overcome these inconveniencies, drivers may carry with them their own filament lamps, which they exchange with the LED lamps in case any problems occur during the monitoring process. This is time consuming, expensive and requires manual operation, which increases driving time, and thus reduces efficiency. For some trailer light arrangements, it is also impossible to exchange the lamps since the LED-lamps use non-standard sockets or no sockets at all. Another possibility would be to use "smart power" semiconductor devices with a sufficiently high resolution. Such devices may not exist, or they may be very expensive.

EP 1 473 190 to applicant discloses a device and a method for detecting the presence of a trailer provided with a subsystem of lamps of different lamp types, LED or filament, said device comprising voltage application means for applying a first voltage to power lines to said subsystem and means measuring the current consumed by components in said subsystem. Given that a LED lamp is consuming less current, a measurement is performed on the total current consumed by all lamps or the current consumed by groups of lamps. By doing this, the total current consumed by the lamps will be high enough for the detection by a "smart power" semiconductor devices with a low resolution. This detection works for the lamps during the ON-period.

Another possibility to overcome the disadvantage that a LED-lamp is not consuming a current high enough for a conventional detection systems, is to provide each LED-lamp with an additional electrical load, causing the LED-lamp to consume a current in the same order as a filament lamp. While this solution makes the monitoring system work properly, this does not allow for a detection of faulty trailer lamps. Excessive heat is also generated in the lamp arrangement.

It is desirable to provide a method and a device, which may alleviate the above problems and provide for a more accurate detection of signal lamps present for a determination of lamp characteristics, such as type and condition, which device and method are operable both for signal lamps in a vehicle and/or in a trailer.

According to an aspect of the present invention, provided are a method and a device for performing the method of detecting signal lamps in a vehicle, in particular in a heavy vehicle, being provided with a plurality of signal lamps, each being capable of switching between an OFF-phase and an ON-phase, said method comprising the steps of: during the OFF-phase of a vehicle signal lamp to be probed, inducing a probing current by connecting an electric current generator to said vehicle signal lamp circuit, the probing current being lower than the nominal current for the lamp in question; detecting the electric voltage level over the lamp circuit; and determining vehicle signal lamp characteristics such as type and condition based on said electric voltage level detection.

Accordingly, a method is provided which contrary to prior art methods utilizes voltage detection for determining type of signal lamp present and condition. Thus, simple circuitry is needed, which may be provided in a stand alone device for post installation in existing vehicles, and which does not require any alterations or supplement components to be added to the existing electric signal lamp sub system in a vehicle, such as towing truck or a trailer. Further, the present invention enables a more robust and thus accurate determination than the prior art of whether an otherwise "faulty" lamp is in fact faulty/not connected or a LED-lamp. Also, the current being supplied to a signal lamp present in the signal lamp subsystem to be probed is minimal, effectively reducing the risk of damaging any LED present.

According to an aspect of the invention, said method further comprises that the result of the determination of vehicle signal lamp characteristics is that the lamp is a LED lamp being connected when the detected voltage level is within a predetermined interval between a first level and a second level. The first level is a low voltage, preferably close to zero, and the second level is somewhat higher than the forward voltage of the diode or diodes comprised in the LED lamp. Due to the non-linear characteristics of the LED-lamp, when the detected voltage level is within such predetermined interval, the detection provides a robust and accurate determination of the lamp being a LED lamp and being connected. A LED lamp usually comprises a plurality of LED's in an array.

A signal lamp, which is either not connected or is faulty, is irrespective of lamp type effectively seen as an open circuit. A filament signal lamp which is working is effectively seen as a short circuit.

It is to be noticed, that a LED lamp, comprising one or more non-working LED's, by the present invention is not necessarily determined as being faulty. This will depend on the type of breakdown by the LED. For a LED lamp comprising several LED's, one LED may be broken but the lamp will still illuminate. If all LED's are connected in parallel, the lamp will illuminate if one LED is functioning. This means that the method will also indicate that the lamp is working, since the voltage drop will be detected as in normal.

For a LED lamp where the LED's are connected in series, and one LED is broken such that the LED is short-circuited, the lamp will be indicated as working, since the voltage drop over the lamp will lie within the predetermined interval. The remaining LED's will illuminate. If the LED is broken such that the LED is open-circuited, the lamp will be indicated as not working. The remaining LED's will not illuminate. This means that the voltage over the lamp will be the same as the voltage of the current source, indicating an open circuit, and thus a faulty lamp. The LED lamp may also comprise a combination of LED's connected in series and in parallel.

The first voltage level of the interval is preferably approximately zero or ground potential, but may alternatively be set somewhat higher, in the order of 100-300 mV or preferably lower than the voltage drop of a single LED used, depending on inherent resistances in the voltage detection circuit and current leakage. A filament lamp in working order is effectively seen as an electrical short circuit by the current generator, resulting in such a low voltage level detected.

In a further aspect of the present invention, further voltage levels may be used. This may be advantageous in order to detect the number of faulty LED's in a LED lamp with several LED's connected in series.

In a further aspect of the present invention, the probing current is in the order of 0.1 mA to 100 mA, and preferably in the order of 5-20 mA. Using such low current is safe, effective and accurate when performing the method according to the present invention. Accordingly, the service life of the components of the circuits probed is increased.

In a further aspect of the present invention the probing current is a DC current. The vehicle battery may provide such low amp DC current in a way known to the skilled person.

In one aspect, the probing current is applied over a predetermined detection time period. Thus, current generator life is extended, and voltage detection may be performed at a certain time, e.g. during start of the vehicle, or during attachment of a trailer to the vehicle. The length of said predetermined time period depends upon the number of lamp circuits to be probed or upon the effectiveness of the voltage level detection means. Alternatively, the probing current is applied between start and stop of a vehicle, or at all times, which may for example be useful during attachment of a trailer when a vehicle motor is not started yet.

The method according to an aspect of the present invention may in one aspect advantageously be used in combination with a conventional trailer presence monitoring system, in which case the vehicle comprises a trailer and wherein the method, before the step of inducing a probing current, further comprising the steps of using a conventional trailer presence monitoring system to indicate which trailer signal lamps is to be probed, and indicating to the monitoring system, which lamps are determined as being faulty/not connected and/or as being LED lamps. Accordingly, an additional measurement of trailer signal lamps is provided for a verification of, whether the signal lamps being indicated by the conventional trailer presence monitoring system as faulty are in fact faulty/not connected or LED lamps, in which case an indication, e.g. in the form of a signal, is provided to the monitoring system for indicating the faulty lamps and/or the LED lamps and/or the filament lamps, depending on type of conventional trailer presence monitoring system used. Thus, the present invention may be used in supplement to existing monitoring systems alongside the presently available prior art systems. This decreases installation and maintenance costs, and provides an accurate indication of condition and type of trailer lamps present, which is independent upon the type of trailer being attached, i.e. the signal lamps and circuits present therein. A robust method of detection is hereby provided.

For vehicles in general, and in particular for large vehicles, such as trucks or tractors, a method and system is thus provided according to the present invention to in a simple way detect whether any lamp provided in the vehicle or on a trailer being towed is a conventional filament lamp or a LED-lamp, and whether it is faulty/not connected. This is in particular advantageous for vehicles towing trailers, where the signal lamp types of the trailer are not known beforehand, i.e. the trailer is not specially adapted to being probed by existing technologies.

Preferably, the vehicle is a trailer being towed by a truck or a tractor. The vehicle comprising LED lamps being probed may also comprise other types of vehicles, not only large vehicles like trucks and trucks towing trailers, but also cars, motorcycles, busses, trains, trams, etc.

Preferably the device according to an aspect of the invention further comprises indicator means for an indication of faulty or not connected lamps to the driver of the vehicle based on said vehicle signal lamp type and condition determination. Thus, a driver may be alerted as to which faulty/not connected signal lamps are present. This indication means may e.g. be an indicator display providing one or more warning lights at to the precise location of the faulty lamps upon the vehicle, or an indicator lamp only indicating that faulty signal lamps are present, and being provided either inside the vehicle driving compartment or upon the outer side, e.g. in combination with a conventional trailer presence monitoring system.

In preferred embodiments of the device according to an aspect of the present invention, the combination of said voltage detection means and said vehicle signal lamp determination means is forming one unit, such as a voltage comparator circuit, or in combination with said current generator is forming one unit, respectively. This reduces size and number of components utilized, bringing down costs, and a voltage comparator circuit is able to perform both of the latter steps of the present method in one step. A single unit is advantageous for post-fabrication installation in any type of vehicle.

BRIEF DESCRIPTION OF THE DRAWINGS

The invention will be described in detail below with reference to the accompanying schematic drawing, in which.

DETAILED DESCRIPTION

Figure 1:
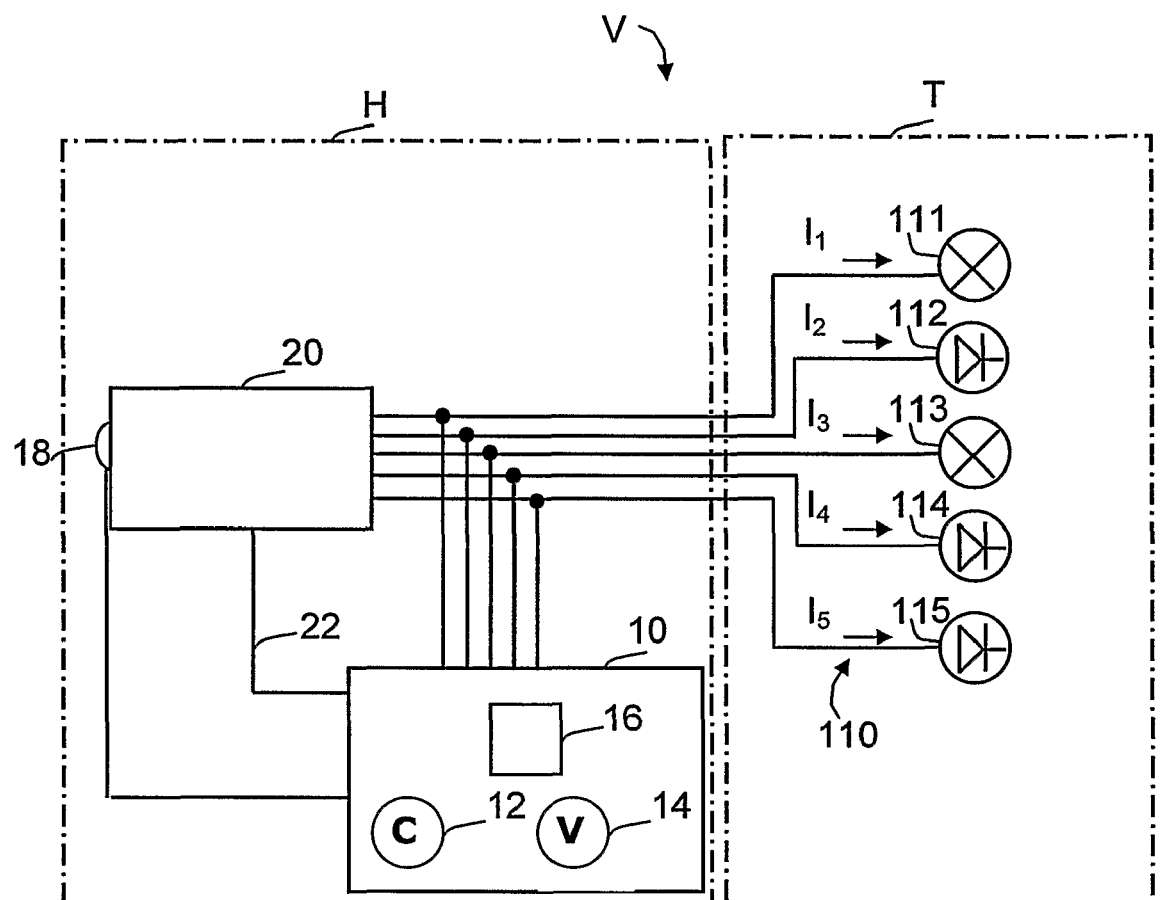
FIG. 1 shows one embodiment of a device according to the invention for performing the method according to the invention.

FIG. 1 shows a device 10 according to one aspect of the present invention provided in combination with a conventional trailer presence monitoring system 20 of the "flasher" type. A trailer T is attached to a truck H, the vehicle V thus comprising in this case a truck H being attached to a trailer T, in which truck H said device 10 and system 20 are provided. Alternatively, said device 10 may be provided in the trailer T. In order to ensure power supply to a turn signal lamp subsystem 110 in the trailer T, power cords from the trailer T are attached to a corresponding outlet in the vehicle V.

In relation to the drawing and the following description, the device and method will be described as being preferably applied to a large vehicle electrically connected to and towing a trailer. However, it should be understood that this is intended only to clarify and ease the understanding of the invention. By the invention it has been realised that the device and method according to the present invention can be applied to any lamp subsystem provided in a vehicle, in which LED lamps needs to be detected and/or identified, e.g. in vehicle signal lamp sub systems, in which conventional lamps have been replaced by LED lamps, such as attachable LED lamps. Accordingly, an autonomous determination may be performed by the method and device according to the present invention, independently of any existing signal lamp sub system monitoring system, such as a trailer presence monitoring system.

Further to FIG. 1, the signal lamp subsystem 110 comprises a plurality of signal lamps, in the example shown five lamps 111, 112, 113, 114, 115, of which three of these 112, 114, 115 are signal lamps comprising LED-technology and two of these are conventional filament lamps 111, 113. Each signal lamp is capable of switching between an OFF-phase and an ON-phase, i.e. between phases in which the lamp is turned off and turned on, respectively, driven by the power cords, respectively.

Using a conventional trailer presence monitoring system 20 of the flashing type, e.g. as disclosed in DE 199 44 508 or DE 199 50 851, for an indication of lamps being faulty but wherein such conventional system is not able to make a distinction between LED lamps and faulty or not connected lamps, the present invention is provided as a supplement, either determining signal lamp type for all lamps 111-115 in the trailer or alternatively only for those lamps, which the conventional flasher-type monitoring system has indicated as being faulty. In FIG. 1, the detection according to the invention is performed on signal lamps 112 to 115, because the conventional trailer presence monitoring system 20 through connection 22 is indicating to the device 10 that these four signal lamps are faulty or not connected.

The device 10 for detecting signal lamps in a vehicle according to the invention in the embodiment shown in FIG. 1 comprises an electric current generator 12, voltage detection means 14 and vehicle signal lamp determination means 16.

In FIG. 1, the electric current generator 12 is of a standard current generator type known to the skilled person. It may comprise a standard rechargeable type battery, but is preferably powered from the battery of the vehicle. Appropriate current control may be applied in order to apply a suitable low current to the lamp circuits. In the preferred embodiment, the current generator 12 is a DC source, but it may alternatively be an AC source. The current generator 12 delivers a probing current that is lower than the nominal current for the lamp in question. The nominal current for a lamp is the current drawn by the lamp in a normal condition. During probing, the probing current is much lower, preferably in the order of 1/10 or lower of the nominal current. Thus, the current generator is at least delivering a current which is able to induce a low current in the order of from 0.1 mA to 100 mA, 11, 12, 13, 14, 15 into each of the power lines for the signal lamps 111, 112, 113, 114, 115.

Alternatively, this may be done by separate probing lines (not shown) to each lamp circuit in said signal lamp sub system. In FIG. 1 as shown, lamp 111 is not probed and 11 is thus equal to zero mA, 12 is equal to approx. 2 mA, 13 is equal to approx. 2 mA, 14 is equal to approx. 2 mA and 15 is equal to approx. 2 mA. The reason for only four lamps being probed is that the device 10 is responding to the indication by the conventional trailer presence monitoring system 20 of these four latter lamps being determined as faulty/not connected when performing a flasher-type monitoring of these in total five lamps.

The lamp circuits are connected e.g. grounded in a way known to the skilled person in such a way that the voltage detection means 14 is performing one or several successive measurement of the voltage level over each individual signal lamp circuit.

Given the facts that 112, 114, and 115 are LED lamps, and that LED-lamp 115 is in reality faulty (not shown), the device 10 by performing the method according to the invention is determining, which of these four lamps 112, 113, 114, 115 are in fact faulty and which are in fact LED lamps, said determination being performed by the vehicle signal lamp determination means 16, based on the voltage level detected by the voltage detection means 14.

Said determination means 16 comprises electronic circuitry, such as one or more voltage comparators with single or multiple voltage detection levels e.g. in combination with logic devices, in which case the detection and determination step is performed in one single step. Such voltage comparators are known to the person skilled in the art, and will not be discussed further in the present application.

Alternatively, said determination may also be performed based on one or more logic devices, such as a processor with storage means, comprising predetermined or adjustable electric voltage detection levels, e.g. comprising a look-up table comprising different voltage levels and corresponding signal lamp characteristics, allowing for an increased number of voltage level being detectable, e.g. when different types of LED lamps 112, 114, 115 are being used in the vehicle V. The adjustability comprises user input set levels, or adaptive levels, e.g. based upon known voltage deterioration characteristics over time for the type of current generator being used.

Preferably, the result of the determination of vehicle signal lamp characteristics comprises that the signal lamp is a LED lamp being connected, when the detected voltage level is between a first level and a second level. The first level is a low voltage, preferably close to zero, and the second level is somewhat higher than the forward voltage of the diode or diodes comprised in the LED lamp. In reality, since the number of LED's used and the type of LED's used may be unknown, the second level is preferably set at a level sufficiently below the nominal voltage of the system in order to differ between a LED lamp and an open circuit. For a heavy vehicle with a system voltage of 28.8 volts, the second level may be in the order of 15-20 volts. This will allow the device to detect a LED lamp, which may have a voltage drop of typical 10-12 volts. This voltage drop depends on the number of LED's connected in series and the device is thus preferably adapted to this. Based upon any determination of this type, the determination is a very robust one, effectively removing a LED lamp from the list of suspected not-connected or faulty signal lamps.

The result of the determination of vehicle signal lamp characteristics is that the signal lamp is faulty or not connected when the detected voltage level is close to or equal to the nominal system voltage of the system, and the signal lamp is a filament lamp being connected when the detected voltage level is close to zero voltage, respectively.

Each signal lamp 112, 113, 114, 115 is being probed, either successively or at the same time, by the device 10, and the result of the above vehicle signal lamp determination is thus, that lamps 113 and 115 are determined faulty or not connected. Also, the result is that signal lamps 112 and 114 are determined being connected LED lamps, and that signal lamp 111, based on the result from the determination by the conventional system 20, is determined being a conventional filament signal lamp.

Accordingly, a method and a device according to the invention is described for detecting signal lamps in a vehicle, in particular in a large vehicle, wherein is provided a plurality of signal lamps, each being capable of switching between an OFF-phase and an ON-phase, comprising an electric current generator, which is arranged to, during the OFF-phase of a vehicle signal lamp to be probed, induce a probing current into said vehicle signal lamp circuit, the probing current being lower than the nominal current for the lamp in question; voltage detection means, which is arranged to measure the electric voltage level over the lamp circuit; and vehicle signal lamp determination means, which is operable to determine vehicle signal lamp characteristics such as type and condition based upon the electric voltage level detected.

The probing current is preferably applied over a predetermined detection time period, e.g. a few ms. Thus, the current generator life is extended and voltage detection may be performed at a certain time, e.g. during start of the vehicle, or during attachment of a trailer to the vehicle. Alternatively, the probing current is applied during motor operation, or even continuously, also when the motor is turned off, which may for example be advantageous during attachment of a trailer.

Said method of determining vehicle signal lamps characteristics in a vehicle may advantageously be used to indicate to the driver and/or maintenance personnel, where such faulty lamps are placed in the vehicle V. The method is also advantageously used by the vehicle electric system to detect if a trailer is connected to the vehicle. This detection is used to set driving parameters for the vehicle with an attached trailer, e.g. gear change mode when the vehicle is equipped with an automatic or semi-automatic gear box. In the embodiment shown in FIG. 1, the device 10 is coupled to an indicator lamp 18 upon the conventional monitoring system 20 for an indication of at least one signal lamp being faulty upon the trailer T. Alternatively, a display may be provided to pinpoint the exact location of such faulty lamp or lamps in the vehicle V and thus reducing the inspection time needed for an identification of such faulty lamp/lamps. The location of such indicator 18 may be at the trailer attachment point, in the trailer presence monitoring system 20, either as part of said system or provided alongside it, either on the side of the towing vehicle or inside the cab of the truck V or driving compartment. The device 10 according to the invention may be a single device provided as one system, or alternatively as an integral part of the trailer presence monitoring system 20. In a preferred embodiment, the indication from the device 10 is provided to the system 20 for further processing of this information inside said system 20, e.g. to enable a more complex indication of lamp characteristics, such as faulty lamps, properly working conventional and LED lamps, and even LED-lamp type, etc, giving a more complete picture of signal lamp presence and absence.

Other embodiments of the device according to the present invention may be foreseen by the person skilled in the art, which embodiments lie within the wordings of the appended claims, in particular the device being an integral part of a trailer presence monitoring system. Alternatively, the device may be part of the electronic lamp circuit for a vehicle, in which it may be anticipated that conventional lamps may be substituted by LED-lamps after sale.

The invention claimed is:

1. A method for detecting signal lamps in a vehicle being provided with a plurality of signal lamps each being capable of switching between an OFF-phase and an ON-phase, the method comprising the steps of during the OFF-phase of a vehicle signal lamp to be probed, inducing a probing current by connecting an electric current generator to the vehicle signal lamp circuit, the probing current being lower than a nominal current for the lamp;

detecting an electric voltage level over the lamp circuit; and determining vehicle signal lamp types and conditions based on the electric voltage level detection.

2. A method according to claim 1, wherein a result of the determination of vehicle signal lamp types and conditions is that the lamp is determined to be a LED lamp being connected when the detected voltage level is within a predetermined interval between a first voltage level and a second voltage level.

3. A method according to claim 2, wherein a result of the determination of vehicle signal lamp types and conditions is that the lamp is determined to be at least one of faulty or not connected when the detected voltage level is above the predetermined second voltage level.

4. A method according to claim 2, wherein a result of the determination of vehicle signal lamp types and conditions is that the lamp is determined to be a filament lamp being connected when the detected voltage level is below the predetermined first voltage level.

5. A method according to claim 1, where the probing current is in the order of 0.1 mA to 100 mA.

6. A method according to claim 1, where the probing current is a DC current.

7. A method according to claim 1, where the probing current is applied over a predetermined detection time period.

8. A method according to claim 1, where the vehicle comprises a trailer and wherein the method, before the step of inducing a probing current, further comprises the steps of
   using a conventional trailer presence monitoring system to indicate which trailer signal lamps are to be probed, and
   indicating to the monitoring system, which lamps are determined as being at least one of faulty, not connected or LED lamps.

9. A method according to claim 1, where the vehicle is a trailer.

10. A device detecting signal lamps in a vehicle, in which vehicle is provided a plurality of signal lamps, each lamp being capable of switching between an OFF-phase and an ON-phase, comprising
   an electric current generator arranged to, during the OFF-phase of a vehicle signal lamp to be probed, induce a probing current into the vehicle signal lamp circuit, the probing current being lower than the nominal current for the lamp in question;
   voltage detection means, for measuring the electric voltage level over the lamp circuit; and
   vehicle signal lamp determination means, for determining vehicle signal lamp types and conditions based upon the electric voltage level detected.

11. A device according to claim 10, wherein a result of the determination of vehicle signal lamp types and conditions is that the signal lamp is determined to be a LED lamp being connected when the detected voltage level is within a predetermined interval between a first voltage level and a second voltage level.

12. A device according to claim 10, wherein a result of the determination of vehicle signal lamp types and conditions is that the signal lamp is determined to be faulty or not connected when the detected voltage level is above or equal to approximately the applied maximum voltage over the lamp.

13. A device according to claim 11, wherein a result of the determination of vehicle signal lamp types and conditions is that the signal lamp is determined to be a filament lamp being connected when the detected voltage level is below the predetermined first voltage level.

14. A device according to claim 10, wherein the probing current is in the order of 0.1 mA to 100 mA.

15. A device according to claim 10, wherein the electric current generator is providing a DC probing current.

16. A device according to claim 10, further comprising indicator means for an indication of faulty or not connected lamps based on the vehicle signal lamp type and condition determination.

17. A device according to claim 10, which is in communication with a conventional trailer presence monitoring system for an indication of which signal lamps are to be probed and which device further comprises means for indication to the monitoring system, which lamps are determined as being at least one of faulty, not connected or LED lamps.

18. A device according to claim 10, wherein a combination of the voltage detection means and the vehicle signal lamp determination means forms one unit.

19. A device according to claim 10, wherein a combination of the current generator, the voltage detection means and the vehicle signal lamp determination means forms one unit.

* * * * *